(12) United States Patent
Faure et al.

(10) Patent No.: US 12,005,490 B2
(45) Date of Patent: Jun. 11, 2024

(54) METHOD AND FACILITY FOR THE PRODUCTION OF A BRAIDED BEAD WIRE FOR A PNEUMATIC TIRE, COMPRISING THE FOLDING OF A SURPLUS LENGTH OF BRAIDING WIRE

(71) Applicant: Compagnie Generale Des Etablissements Michelin, Clermont-Ferrand (FR)

(72) Inventors: Yann Faure, Clermont-Ferrand (FR); Raphael Martinez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 827 days.

(21) Appl. No.: 17/053,906

(22) PCT Filed: May 13, 2019

(86) PCT No.: PCT/FR2019/051072
§ 371 (c)(1),
(2) Date: Nov. 9, 2020

(87) PCT Pub. No.: WO2019/220045
PCT Pub. Date: Nov. 21, 2019

(65) Prior Publication Data
US 2021/0308739 A1 Oct. 7, 2021

(30) Foreign Application Priority Data

May 14, 2018 (FR) ...................................... 1854009

(51) Int. Cl.
*B21F 7/00* (2006.01)
*B29D 30/48* (2006.01)

(52) U.S. Cl.
CPC ................ *B21F 7/00* (2013.01); *B29D 30/48* (2013.01); *B29D 2030/487* (2013.01)

(58) Field of Classification Search
CPC ...... B21F 7/00; B29D 30/48; B29D 2030/487
See application file for complete search history.

(56) References Cited

U.S. PATENT DOCUMENTS

| 942,732 A | 12/1909 | Morford |
|---|---|---|
| 1,616,337 A | 2/1927 | Slonecker |

(Continued)

FOREIGN PATENT DOCUMENTS

| EP | 0433917 A1 | 6/1991 |
|---|---|---|
| EP | 0433918 A1 | 6/1991 |

(Continued)

*Primary Examiner* — Tajash D Patel
(74) *Attorney, Agent, or Firm* — Dickinson Wright PLLC; Steven C. Hurles

(57) ABSTRACT

The method comprises a braiding step during which a braiding wire is wound in helical turns about, and along, a generatrix line which is closed in a ring about a main axis, so as to form a bead wire element called "braided torus" within which the braid wire has, on the one hand, a winding section which corresponds to the helical turns and which occupies a braid volume, and, on the other hand, in an extension of said winding section, a surplus length of braid wire called "excess section". After the braiding step, there is a folding step during which the excess section is plastically deformed by folding, preferably by means of a punch and an anvil, so as to form an elbow which makes the excess section diverge with respect to the helical turns and makes said excess section protrude at least partly with respect to the braid volume.

16 Claims, 4 Drawing Sheets

(56) References Cited

U.S. PATENT DOCUMENTS

| | | | |
|---|---|---|---|
| 3,168,912 A | 2/1965 | Marica | |
| 4,342,138 A * | 8/1982 | Simich | B21F 45/16 |
| | | | 24/20 EE |
| 6,524,416 B1 * | 2/2003 | Kubinski | B29D 30/48 |
| | | | 156/131 |

FOREIGN PATENT DOCUMENTS

| | | | | |
|---|---|---|---|---|
| EP | 0442242 A2 | 8/1991 | | |
| EP | 2537667 A1 | 12/2012 | | |
| FR | 2234224 A1 | 1/1975 | | |
| JP | 2007160640 A | 6/2007 | | |
| WO | WO-2020136323 A1 * | 7/2020 | | B29D 30/48 |

* cited by examiner

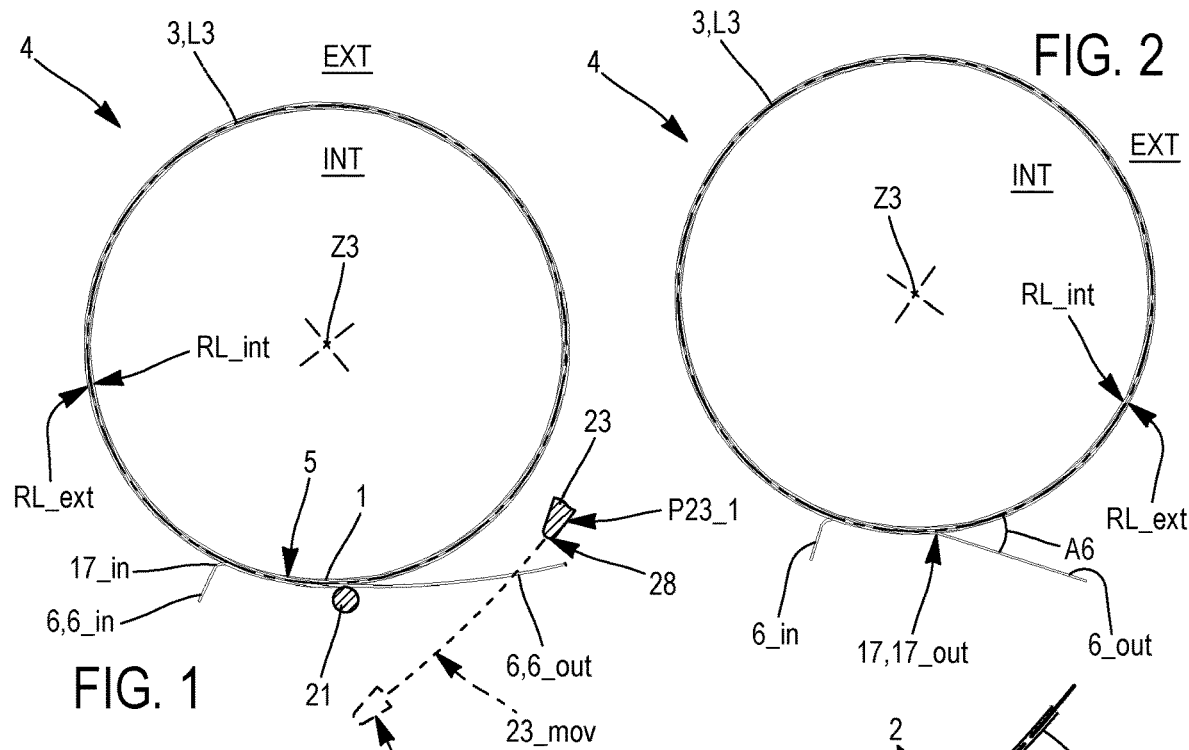
FIG. 1
FIG. 2
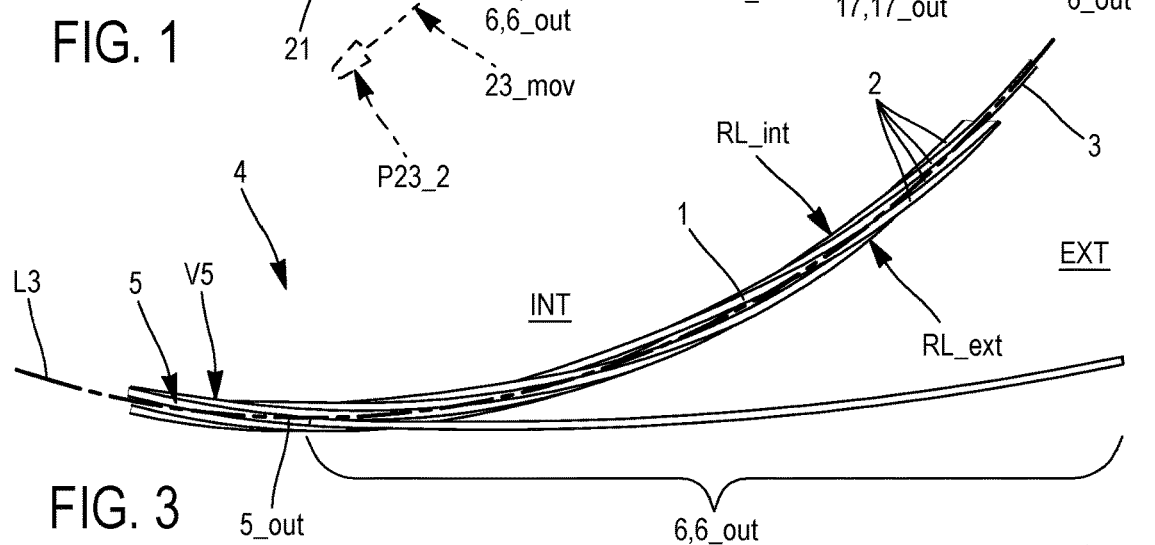
FIG. 3
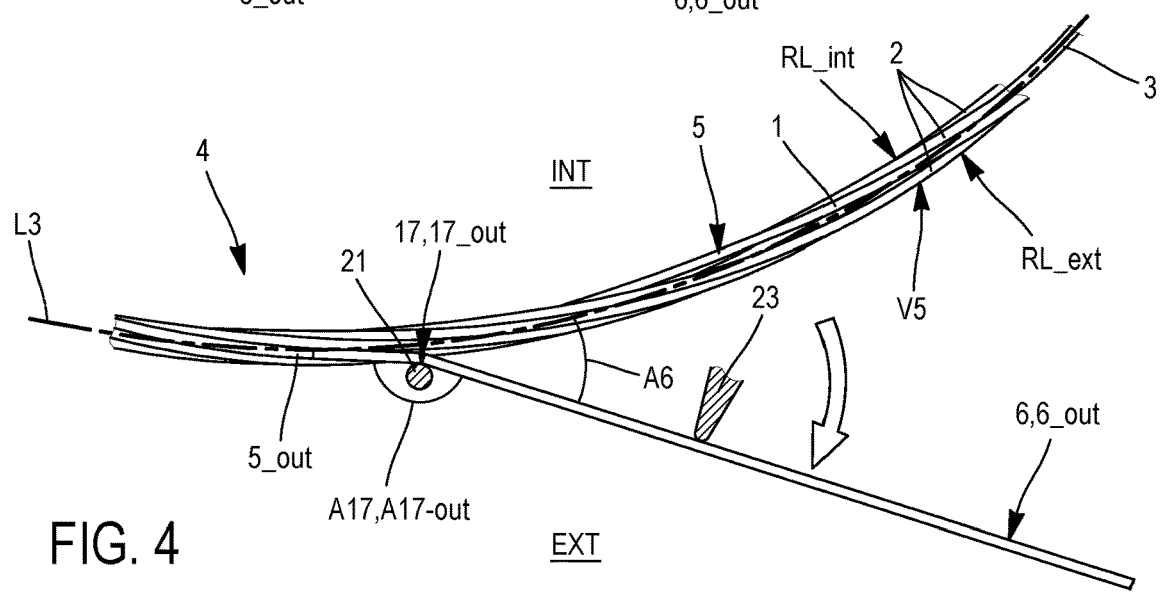
FIG. 4

METHOD AND FACILITY FOR THE PRODUCTION OF A BRAIDED BEAD WIRE FOR A PNEUMATIC TIRE, COMPRISING THE FOLDING OF A SURPLUS LENGTH OF BRAIDING WIRE

CROSS-REFERENCE TO RELATED APPLICATIONS

This application claims priority to and the benefit of PCT Patent Application No. PCT/FR2019/051072, filed May 13, 2019, entitled "METHOD AND FACILITY FOR THE PRODUCTION OF A BRAIDED BEAD WIRE FOR A PNEUMATIC TYRE, COMPRISING THE FOLDING OF A SURPLUS LENGTH OF BRAIDING WIRE" and French Patent Application No. 1854009, filed May 14, 2018, entitled "METHOD AND FACILITY FOR THE PRODUCTION OF A BRAIDED BEAD WIRE FOR A PNEUMATIC TYRE, COMPRISING THE FOLDING OF A SURPLUS LENGTH OF BRAIDING WIRE."

BACKGROUND OF THE INVENTION

1. Field of the Invention

The present disclosure relates to the field of the production of reinforcing bead wires which are intended to reinforce tires, notably pneumatic tires, in order to ensure the securing of such tires on a rim.

2. Related Art

As is known per se, a bead wire takes the form of an annular element made of rigid material, generally metallic, which can consist of a monolithic strand or, preferably, of a loom comprising several interleaved strands.

In the production of a bead wire, it is therefore known practice to provide a braiding step during which a braid wire is wound in helical turns, about a core which is closed in a ring on itself, so as to obtain a braided torus which will form the body of the bead wire.

It is also known practice, notably from the document JP-2007-160640, to provide, in the braiding operation, surplus lengths of braid wire which form, at each of the two ends of the braid wire, an excess section, then to then adjust these excess sections lengthwise by cutting which is performed after the braiding operation, and to do this in such a way as to be able to then join the ends of the braid wire by means of a crimped sleeve, which makes it possible to keep said braid wire closed on itself, which ensures the cohesion of the braided torus and therefore, more globally, of the corresponding bead wire.

SUMMARY OF THE INVENTION

The inventors have however found that it was sometimes difficult to suitably and rapidly position the excess sections of braid wire for the cutting operation, without affecting the braided torus, or taking the risk of an inaccurate cut which could lead to an improper assembly of the sleeve.

The objects assigned to the disclosure consequently aim to remedy the abovementioned drawbacks and propose a novel method for producing bead wires which guarantees an effective and reproducible processing of the braided toruses after braiding, including at high production rates.

The objects assigned to the disclosure are achieved by means of a method for producing a bead wire intended for the reinforcement of a tire, such as a pneumatic tire, said method comprising a braiding step (S1) during which a braid wire is wound in helical turns about, and along, a generatrix line which is closed in a ring on itself about an axis called "main axis", and more than one complete turn in azimuth about the main axis is thus described with said braid wire so as to form, about said main axis, a bead wire element called "braided torus" within which the braid wire has, on the one hand, a portion called "winding section" which corresponds to the helical turns and which occupies a volume called "braid volume", and, on the other hand, in the extension of said winding section, a surplus length of braid wire called "excess section", said method being wherein it comprises, after the braiding step (S1), a folding step (S2) during which the excess section is deformed plastically by folding, so as to form an elbow which makes the excess section diverge with respect to the helical turns and makes said excess section protrude at least partly with respect to the braid volume of the braided torus.

Advantageously, the folding operation provided by the disclosure makes it possible to make the excess section easily accessible and manipulable by a tool external to the braided torus.

More particularly, this elbow configuration notably makes it possible, as will be seen hereinbelow, to easily recover the excess section and to act easily on the latter to provoke a slight local elastic flexing of a portion of the braid wire called "end turn section", which links the winding section to the elbow, said local elastic flexing being, on the one hand, sufficient to make said end turn section accessible to a cutting tool then to a sleeve-coupling joining tool, and, on the other hand, sufficiently moderate to substantially allow an elastic return into place, against the braided torus, of the ends of the braid wire after said ends of the braid wire have been joined by the sleeve-coupling operation.

In that way, the disclosure makes it possible to proceed, in a controlled and reproducible manner from one bead wire to another, with the braiding then cutting and sleeve-coupling operations. It is thus possible to obtain, systematically, a bead wire which satisfies the requisite requirements of robustness and of finishing quality.

It will also be noted that the elbow formed by the excess section can advantageously help stabilize, in the manner of a catch hook, the braid wire on the braided torus, after the operations of braiding and then of folding, and before the operations of cutting and of sleeve-coupling, which makes it possible to easily manipulate the braided torus, without the risk of impairment, for example to transport said braided torus to a sleeve-coupling station that is remote and distinct from the braiding station, or even store the braided torus, after the braiding and folding operations, in a buffer storage space, pending the operations of cutting and then of sleeve-coupling.

That makes it possible to optimize the arrangement of the machine infrastructure and the management of the bead wire production flows, by notably taking into consideration the respective capacities and the respective cycle times of the braiding station and of the sleeve-coupling station. In particular, it is thus possible to envisage providing one and the same sleeve-coupling station assigned to processing the braided toruses obtained from multiple distinct braiding stations.

BRIEF DESCRIPTION OF DRAWINGS

Other objects, features and advantages of the disclosure will emerge in more detail on reading the following description, and with the aid of the attached drawings, provided in a purely illustrative and nonlimiting manner, among which:

FIG. 1 illustrates, by a front view, an example of braided torus resulting from a braiding step according to the disclosure.

FIG. 2 illustrates, by a front view, the braided torus of FIG. 1 after the folding step according to the disclosure.

FIG. 3 illustrates, by a detail front view, a part of the braided torus of FIG. 1 and of an excess section thereof after the braiding step, and before the folding step.

FIG. 4 illustrates, by a detail front view, the principle of implementation of a folding step according to the disclosure, and the arrangement, which results from said folding step, of the part of braided torus and of its excess section as represented in FIG. 3.

DETAILED DESCRIPTION OF THE ENABLING EMBODIMENT

The present disclosure relates to a method for producing a braid wire intended for the reinforcement of a tire, such as a pneumatic tire, intended for a vehicle wheel.

Said method comprises a braiding step (S1) during which a braid wire 1 is wound in helical turns 2 about, and along, a generatrix line L3 which is closed in a ring on itself about an axis called "main axis" Z3, and more than one complete turn in azimuth about the main axis Z3 is thus described with said braid wire 1.

In that way, a braid wire element, called "braided torus" 4, is formed, about said main axis Z3, as is illustrated in FIG. 1.

Within said braided torus 4, the braid wire 1 has, on the one hand, a portion of length called "winding section" 5 which corresponds to the helical turns 2 and which occupies a volume called "braid volume" V5, and, on the other hand, following said winding section 5, a surplus length of braid wire called "excess section" 6, as is notably visible in FIGS. 1 and 3.

The winding section 5 will correspond to all of the length of the braid wire 1 over which said braid wire is effectively shaped in helical turns 2, the arrangement of which makes said turns 2 potentially compatible with their definitive integration in the finished bead wire.

Figure 5A:
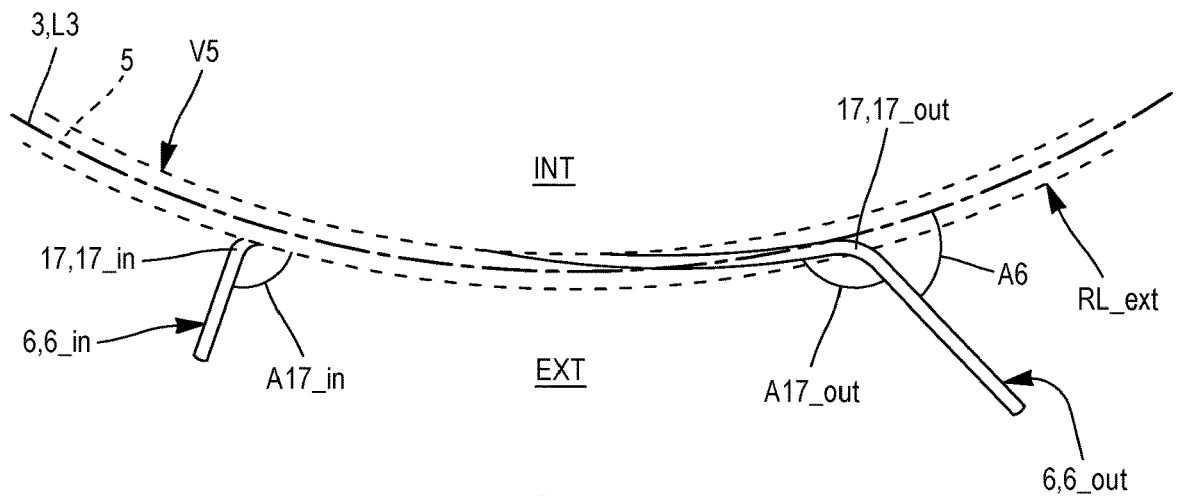
FIGS. 5A and 5B illustrate, by schematic front views, the principle of a driving step according to the disclosure, during which the braided torus of FIGS. 2 and 4 is manipulated by exerting a thrust on the excess sections of the braid wire, so as to expose the corresponding sections of end turns of the braid wire protruding with respect to the braided volume, and thus be able to cut to the desired length, then join by sleeve-coupling, said end turn sections of the braid wire.
Figure 5B:
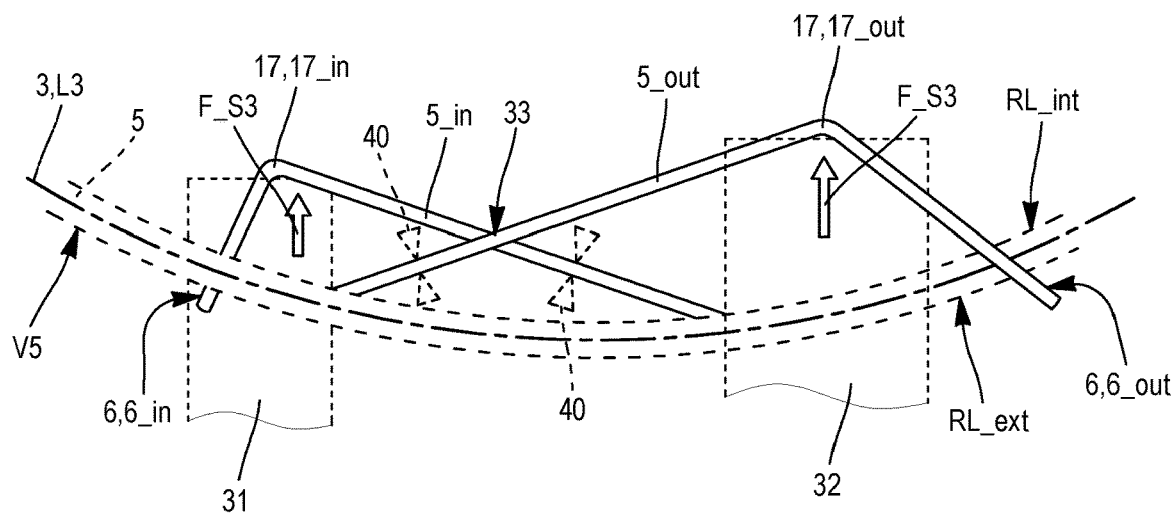
Figure 5C:
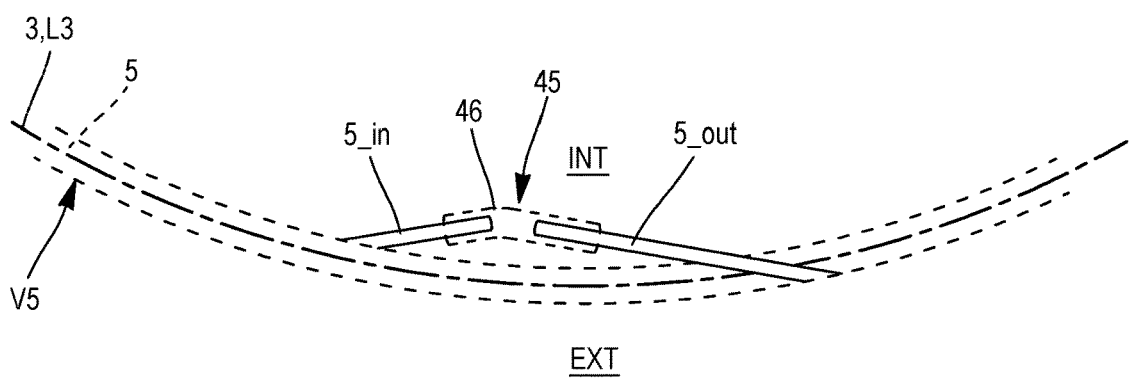
FIG. 5C illustrates, by a schematic front view, the principle of a step of cutting of the ends of the braid wire, followed by a joining step during which the ends of the braid wire are joined by a crimped sleeve, such that said ends have been adjusted lengthwise during the cutting step.

In practice, said winding section 5 can initially have, in the braided torus 4, a length wound in helical turns 2 which is slightly greater than the overall length of the helical turns 2 which will actually be retained definitively within the finished bead wire, and in order to provide, in reserve, at the longitudinal ends of said winding section 5, end turn sections 5_in, 5_out, which have a helical arrangement that is substantially, even exactly, identical to that of the other helical turns 2, but which will be able to be adjusted lengthwise by cutting in the bead wire production process, as will be described below with reference notably to FIGS. 5B and 5C.

In any case, when a braid wire 1 is considered that has been subjected to a braiding step (S1) according to the disclosure, then the winding section 5 therefore covers, at least, all the length of said braid wire 1 which will be intended to remain permanently within the finished bead wire.

The excess section 6 will preferably be temporary, inasmuch as it will preferably be intended to be removed, typically by a cutting operation, so as not to be incorporated in the finished bead wire, contrary to the winding section 5.

Because of this, and also to facilitate the fashioning of said excess section 6 by folding, said excess section 6 will preferably have an arrangement that is different from the helical arrangement of the constituent turns 2 of the winding section 5, and, for example, will not be wound in turns about the generatrix line L3.

In absolute terms, it is possible to provide, according to the disclosure, an excess section 6 in the extension of one, of the other, or of each of the two longitudinal ends of the winding section 5, and therefore, more particularly, at one, at the other, or at each of the two longitudinal ends of the braid wire 1.

In particular, it will thus be possible to provide, as will be detailed below, on the one hand, an input excess section 6_in, situated upstream of the winding section 5, that is to say which precedes the winding section in the direction of the braiding, and which is therefore connected to an input end turn section 5_in, and, on the other hand, an output excess section 6_out, situated downstream of the winding section 5, that is to say which is formed after said winding section 5_in the order of the braiding process, and which is therefore connected to an output end turn section 5_out.

Hereinbelow, for convenience of description, it will preferably be considered that the method is applied, possibly exclusively, to an excess section 6 which forms an output excess section 6_out, it being clearly understood that the features of the disclosure, and notably all or some of the steps of the method concerned, will be able to apply mutatis mutandis to an input excess section 6_in, or both to an input excess section 6_in and to an output excess section 6_out, if these two types of excess sections are provided within the same braided torus 4, on each side of the winding section 5.

For convenience of description, the expression "excess section 6" will therefore equally designate hereinbelow, unless specified otherwise, both an output excess section 6_out and an input excess section 6_in.

Advantageously, the fact of arranging the braid wire 1 over more than one complete turn about the main axis Z3, that is to say of covering, with said braid wire 1, more than 360 degrees in azimuth about the main axis Z3, makes it possible to close said braid wire 1 on itself in order to maintain the cohesion of the braided torus 4, as will be detailed hereinbelow.

Preferably, when the braid wire 1 is wound in helical turns 2 centered on the helix axis that the generatrix line L3 forms, several successive complete turns in azimuth about the main axis Z3 will be executed, so that the winding section 5 comprises several series of overlapping turns 2 which extend, cumulatively, in azimuth, over several turns about the main axis Z3. That notably makes it possible to obtain a braided torus 4 that is particularly robust and stable.

Preferably, during a same braiding step (S1), and regardless of the number of turns produced by the braid wire 1 about the main axis Z3, the braid wire 1 considered will be wound continuously, and will therefore include, in a single piece, the winding section 5 and the excess section or sections 6, 6_in, 6_out.

The braid wire 1 will be able to be formed in any appropriate material, that is sufficiently rigid and that has a tensile strength greater than a predetermined threshold.

Preferably, the braid wire 1 will be metallic, for example made of steel, possibly coated, for example by a coating made of, or based on, zinc, bronze, copper or brass.

As a variant, it would however be possible to use another material, for example a suitable polymer, or a mixture of suitable polymers, without departing from the scope of the disclosure.

Regardless, the constituent material of the braid wire 1 will of course exhibit, on the one hand, a tensile strength that is sufficient to withstand the stresses, notably the circumferential tensile stresses, that the braid wire will be subjected to within the bead wire in the use of the tire, and, on the other hand, the intrinsic properties of plasticity and rigidity required to perform the plastic folding provided by the disclosure.

Moreover, as an indication, in order to offer a good grip on the excess section 6, making it possible to perform the various steps of the method, while limiting the losses of materials in the bead wire production process, it will be possible to provide for the length of at least one excess section 6, and notably for the length of the output excess section 6_out, to represent between 2% and 20% of the perimeter (overall) of the braided torus 4, and preferably between 3% and 15% of the perimeter of said braided torus 4.

In absolute terms, at least one excess section 6, and notably the output excess section 6_out, will be able to have a length of between 5 cm and 20 cm, preferably between 7 cm and 15 cm, and this will be the case notably within braided toruses 4 which have a diameter (considered overall, relative to the main axis Z3) of between 342 mm and 645 mm, and which are therefore typically intended for bead wires designed to equip rims of 13 inches to 24 inches.

Preferably, the generatrix line L3, which is represented by chain-dotted lines in FIGS. 1 to 4, 5A to 5C and 7, is embodied by a core 3, single-stranded or multi-stranded, which is closed in a ring on itself about the main axis Z3.

Said core 3 advantageously forms a braiding support, about and along which the braid wire 1 is wound in helical turns 2, as stated above.

Said core 3 can be single-stranded, that is to say formed by a single monolithic core wire, or, as a variant, multi-stranded, that is to say formed by a plurality of interleaved core wires.

The core 3, or the core wires, will be able to be formed in any appropriate material, that is sufficiently rigid and that has a tensile strength greater than a predetermined threshold.

Preferably, the core 3, or the core wires, will be metallic, for example made of steel.

As a variant, it would however be possible to use another material, for example a suitable polymer, or a suitable mixture of polymers, without departing from the scope of the disclosure.

For convenience of description, the generatrix line L3 will be able to be likened to the core 3 hereinbelow.

The disclosure relates also obviously to an installation 9 for producing bead wires intended for the reinforcement of a tire, such as a pneumatic tire.

Figure 6:
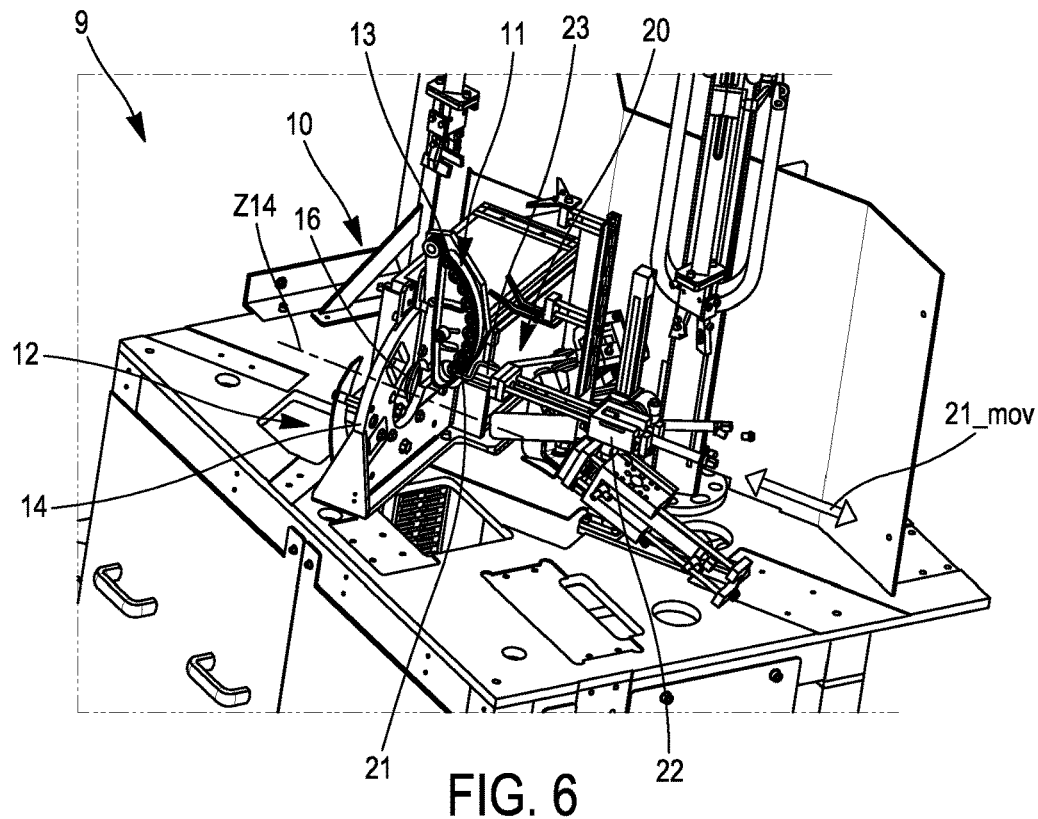
FIGS. 6 and 7 illustrate, respectively by a perspective view and a front view, a bead wire production installation that makes it possible to implement, here on one and the same station, a braiding step and then a folding step according to the disclosure.
Figure 7:
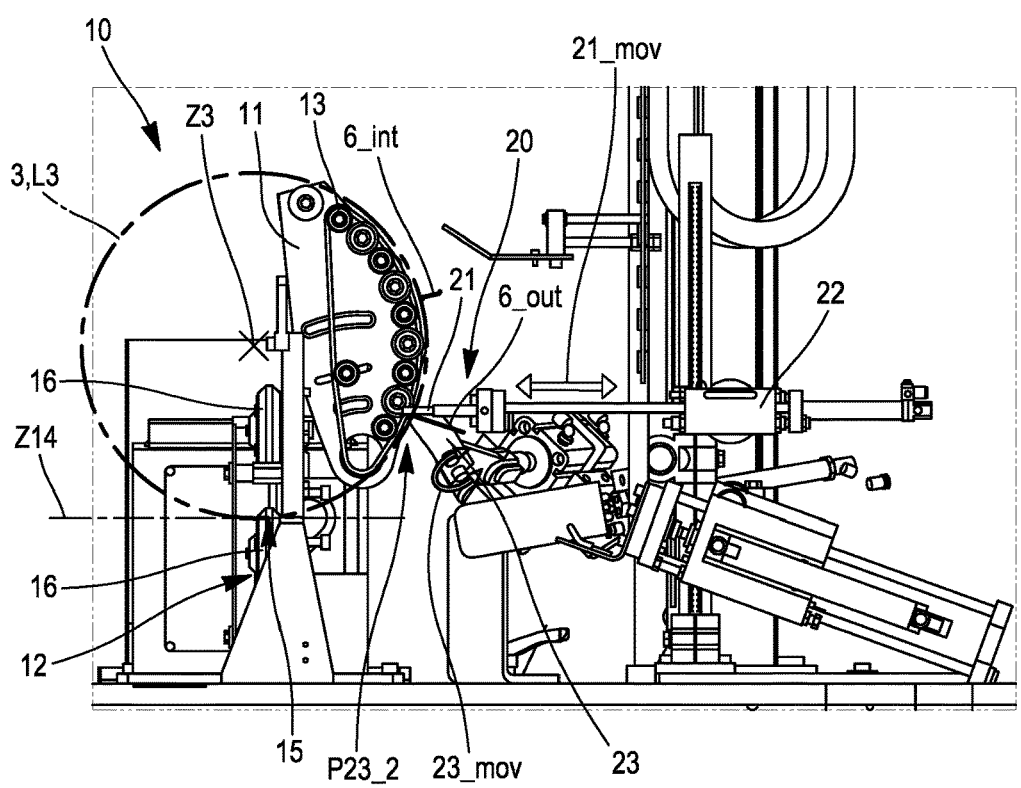

In order to be able to implement a braiding step (S1) according to the disclosure, said installation 9 comprises, as is visible in FIGS. 6 and 7, a braiding station 10.

Said braiding station 10 comprises:
- a guiding support 11 which defines a path which follows a generatrix line L3 which is closed in a ring on itself about an axis called "main axis" Z3, as is visible in FIG. 7,
- a reel 12 which is arranged to bring a braid wire 1 and to cooperate with the guiding support 11 in order to wind said braid wire 1 in helical turns 2 about, and along, said generatrix line L3, here more preferentially about and along the core 3, so as to form, about the main axis Z3, a bead wire element called "braided torus" 4, within which the braid wire 1 has, on the one hand, a portion of length called "winding section" 5 which corresponds to the helical turns 2 and which occupies a volume called "braid volume" V5, and, on the other hand, in an extension of said winding section 5, a surplus length of braid wire called "excess section" 6.

The guiding support 11 will preferably be able to comprise a motorized roller jaw 13, arranged to guide and drive the core 3 in azimuthal rotation about the main axis Z3.

The reel 12 will, for its part, be able to comprise a planetary support 14 which is open at its center to allow the passage of the core 3, and which is mounted to be movable in rotation about a central axis Z14 which coincides with the tangent to the guide line L3 at the point, called "assembly point" 15, where the braid wire 1 meets the core 3 and is wound on the latter.

Preferably, notably to improve the compactness of the installation 9, the generatrix line L3 will be contained in a substantially vertical plane. The assembly point 15 will then preferably be able to coincide with the low point of the core 3, that is to say with the portion of the core 3 having the lowest altitude when the core 3 is in place on the guiding support 11.

The planetary support 14 preferably bears at least one satellite spool 16 which guides the braid wire 1, and which is mounted to rotate on an axis which is parallel to the central axis Z14, but off center relative thereto.

Thus, the composition of the advancing movement of the core 3 along the generatrix line L3, obtained by the azimuthal rotation about the main axis Z3, and the rotational movement of the reel 12, and more particularly of the satellite spool 16, about the central axis Z14, and therefore about the generatrix line L3, makes it possible to create the helical sequencing of the turns 2.

According to the disclosure, the method comprises, after the braiding step (S1), a folding step (S2) during which the excess section 6, here more preferentially the output excess section 6_out, is plastically deformed by folding, so as to form an elbow 17, here more preferentially an output elbow 17_out, which makes the excess section 6 diverge with respect to the helical turns 2 and makes said excess section 6 protrude at least partly with respect to the braid volume V5 of the braided torus 4.

"Plastic deformation" is understood to mean an irreversible deformation which results from the application to the braid wire 1 of a strain which is greater than the intrinsic elastic limit of the constituent material of said braid wire 1. In fact, the aim of the folding step (S2) is to form a lasting elbow 17, which means that the deformation induced during the folding operation is sufficient for, after said folding operation, the braid wire 4 or of the excess section 6 not to revert elastically to the initial position that it occupied before said folding operation, but to retain said elbow 17.

In this particular case, both for convenience and by standard convention, it will be possible to consider that there is a plastic deformation when the braid wire 1 is subjected to a strain which exceeds the conventional elastic limit at 0.2% elongation, denoted Rp0.2, of the constituent material of said braid wire 1. The conventional elastic limit at 0.2% elongation Rp0.2 corresponds, in a tensile test, to the tensile strain which leaves a residual relative elongation, due to a plastic deformation, of 0.2%.

Advantageously, the intrinsic plasticity and rigidity of the material, preferably metallic, which constitutes the braid wire 1, will allow the excess section 6 to retain by itself the form and the curvature of the elbow 17, and consequently the orientation of the free end of said excess section 6, such that this form, this curvature and this orientation result from the permanent plastic deformation obtained by the folding operation. Advantageously, the duly bent excess section 6 will retain, after the folding operation, a non-slack character, which allows it to remain substantially taut, in the protruding configuration sought with respect to the braid volume V5.

Obviously, it will be possible to provide, without departing from the scope of the disclosure, for an elbow 17 to be formed on the input excess section 6_in, to obtain an input elbow 17_in, and/or on the output excess section 6_out, to obtain an output elbow 17_out.

For convenience of description, the expression "elbow 17" will therefore be able to designate, equally hereinbelow unless specified otherwise, both an output elbow 17_out and an input elbow 17_in.

Advantageously, the formation of the elbow 17 and the protruding arrangement of the excess section 6 which results therefrom facilitate the subsequent access to said excess section 6, by a tool external to the braided torus 4, and the subsequent manipulation of said excess section 6 and consequently the manipulation and the positioning of the end turn section 5_in, 5_out which is directly attached to said excess section 6.

Moreover, the elbow 17 can also, or alternatively, fulfil an end stop function, by forming a kind of hook which makes it possible to block the braid wire 1 against the helical turns 2, as is preferably the case of the output elbow 17_out, and/or against the core 3, as is preferably the case of said input elbow 17_in, and which thus prevents the braid wire 1 from unwinding. That way, it is possible to preserve the cohesion of the braided torus 4 in the braiding step (S1) and folding step (S2), and after the latter.

To this end, it will be preferable, for production convenience, to directly confer on said input elbow 17_in its final form, that is to say its final angle, before proceeding with the braiding step (S1) and with the winding of the helical turns 2, so as to be able to use the input elbow 17_in as a hook which retains the braid wire 1 against the core 3 at the start of the braiding operation. This solution also advantageously makes it possible to avoid having the input excess section 6_in form an obstacle to the movement of the reel 12.

That said, according to one possible variant execution, the possibility of forming or accentuating an input elbow 17_in after the braiding operation, in accordance with the abovementioned folding step (S2), notably to reorient the input excess section 6_in as required, after the braiding step (S1), is not precluded.

The output elbow 17 out will, for its part, preferably be formed after the braiding step (S1), in accordance with the abovementioned folding step (S2).

In addition, it will be noted that the elbow 17 can also intrinsically offer, by virtue of its convex form, a grip for a gripping tool, such as a driving paddle 31, 32 which will be intended to elastically push back the corresponding excess section 6 against the braided torus 4 to expose an end turn section 5_in, 5_out thereof with a view to a cutting operation and possibly a joining operation, as will be detailed hereinbelow.

The elbow or elbows 17, 17_in, 17_out, and more particularly the output elbow 17_out which is produced after the braiding operation and therefore after the formation of the winding section 5, make it possible to give the excess section 6, 6_in, 6_out concerned an orientation that is distinct from the orientation which corresponds to the winding (preferably regular) of the helical turns 2, so as to create, or more preferentially to emphasize (notably in the case of the output excess section 6_out), a divergence between the orientation of the excess section 6 and the overall orientation of the turns 2 and of the winding section 5.

Furthermore, the excess section 6 is chosen to be long enough, as has been described above, for the orientation which is conferred on it by the elbow 17 to allow said excess section 6 to extend beyond the substantially toroidal volume V5, occupied by the set of helical turns 2 forming the winding section 5.

This protruding design in fact facilitates the subsequent detection of the excess section 6, and the engagement of a tool engaged with said excess section 6.

To perform the folding step (S2), the installation 9 comprises a folding tool 20, which is distinct from the reel 12, and which is arranged to recover, after the braiding operation, the excess section 6, here more preferentially the output excess section 6_out, and perform a plastic folding of said excess section 6 so as to form an elbow 17 which makes the excess section 6 diverge with respect to the helical turns 2 and makes said excess section 6 protrude at least partly with respect to the braid volume V5 of the braided torus 4.

Preferably, said folding tool 20 is automatic, so that the elbow 17, and in particular, preferably, the output elbow 17_out, is formed automatically, at the end of the braiding operation, which makes it possible to speed up the rate of production of the bead wires.

Preferably, the folding tool 20 comprises a retractable anvil 21 which is movable between, on the one hand, a first position, called "retracted position", that it occupies during the braiding operation and in which said anvil 21 is sufficiently far away from the generatrix line L3 not to interfere with the braiding operation or the braided torus 4 currently being produced, and, on the other hand, a second position, called "extended position", that said anvil 21 adopts for the folding operation, and in which said anvil 21 is closer to the braided torus 4 than in the first position, and preferably in which said anvil 21 is pressed against said braided torus 4, as is illustrated in FIGS. 4, 6 and 7.

In fact, preferably, in the folding step (S2), an anvil 21 is offered up to the braided torus 4 and, more preferentially, an anvil 21 is pressed against said braided torus 4, and the excess section 6, here preferably the output excess section 6_out, is plastically deformed by folding against said anvil 21, so as to form the elbow 17, here preferably an output elbow 17_out.

The use of an anvil 21 helps stabilize the braided torus 4 in the folding operation, and advantageously obtains an excellent reproducibility of the method, by avoiding dispersion of the folding point, that is to say dispersion of the position of the elbow 17 from one braided torus 4 to another.

The anvil 21 can for example take the form, as is illustrated in FIG. 6, of a bent rod, made of rigid material, of which at least one branch extends in a direction substantially parallel to the main axis Z3 and is intended to come, in extended position, into proximity to the excess section 6, and preferably into contact with the excess section 6, for example at the limit of the braid volume V5 and more particularly at the outer radial limit of the winding section 5, to offer a resisting support against which the excess section 6 can be flexed, beyond its elastic limit, to form the elbow 17.

In order not to damage the braid wire 1 forming the winding section 5, while facilitating the folding effect, the section of the anvil 21 will preferably have a rounded form, for example circular.

Preferably, the diameter of this rounded form of the section of the anvil 21 will be able to be between 2 mm and 10 mm, and more preferentially between 6 mm and 8 mm, which notably makes it possible to guarantee a sufficient rigidity of said anvil 21.

For simplicity of implementation, the anvil movement 21_mov between the retracted position and the extended position (or vice versa, from the extended position to the retracted position) will be able to be performed by translation, for example by means of a linear motorized member 22, such as a cylinder 22, bearing the rod of the anvil 21.

Said anvil movement 21_mov will be able to be oriented in a transverse direction, for example radial, with respect to the main axis Z3, in order to allow an access and then easy disengagement of the anvil 21, preferably from radially outside the braided torus 4.

Obviously, it would be possible, as a variant, to offer up the anvil 21 to the braided torus 4 by an anvil movement 21_mov of other appropriate nature, for example by a swivelling movement.

Moreover, preferably, in the folding step (S2), a movable punch 23 is actuated, to recover the excess section 6 and perform, preferably against an anvil 21, as mentioned above, the plastic folding of said excess section 6.

It would be possible, according to a variant implementation, to envisage using only a punch 23, that is to say without anvil 21, in order to perform the folding operation against the opposing mechanical resistance of the braided torus 4 itself, while said braided torus 4 would be held in fixed position within the guiding support 11.

However, preferentially, in order to guarantee the integrity of the braided torus 4 and the reproducibility and the accuracy of the folding operation, a punch 23 and an anvil 21 will preferably be used in combination.

Thus, preferably, the folding tool 20 will be able to comprise a punch 23, and more particularly, a punch 23 which is movable relative to the anvil 21 and arranged to recover the excess section 6 and fold back said excess section 6 against said anvil 21 to cause the plastic deformation which is necessary to the formation of the elbow 17.

The position of the anvil 21, and the movement 23_mov of the punch 23 relative to said anvil 21, will of course be set and controlled so as to obtain the desired position of the elbow 17 and the requisite amplitude of folding with respect to the desired elbow angle A17.

To this end, to take account of the elastic return of the braid wire 1 after the relaxing of the folding effort exerted by the punch 23 and/or the anvil 21, an amplitude of movement will preferably be provided which goes beyond said desired residual elbow angle A17.

Figure 8:
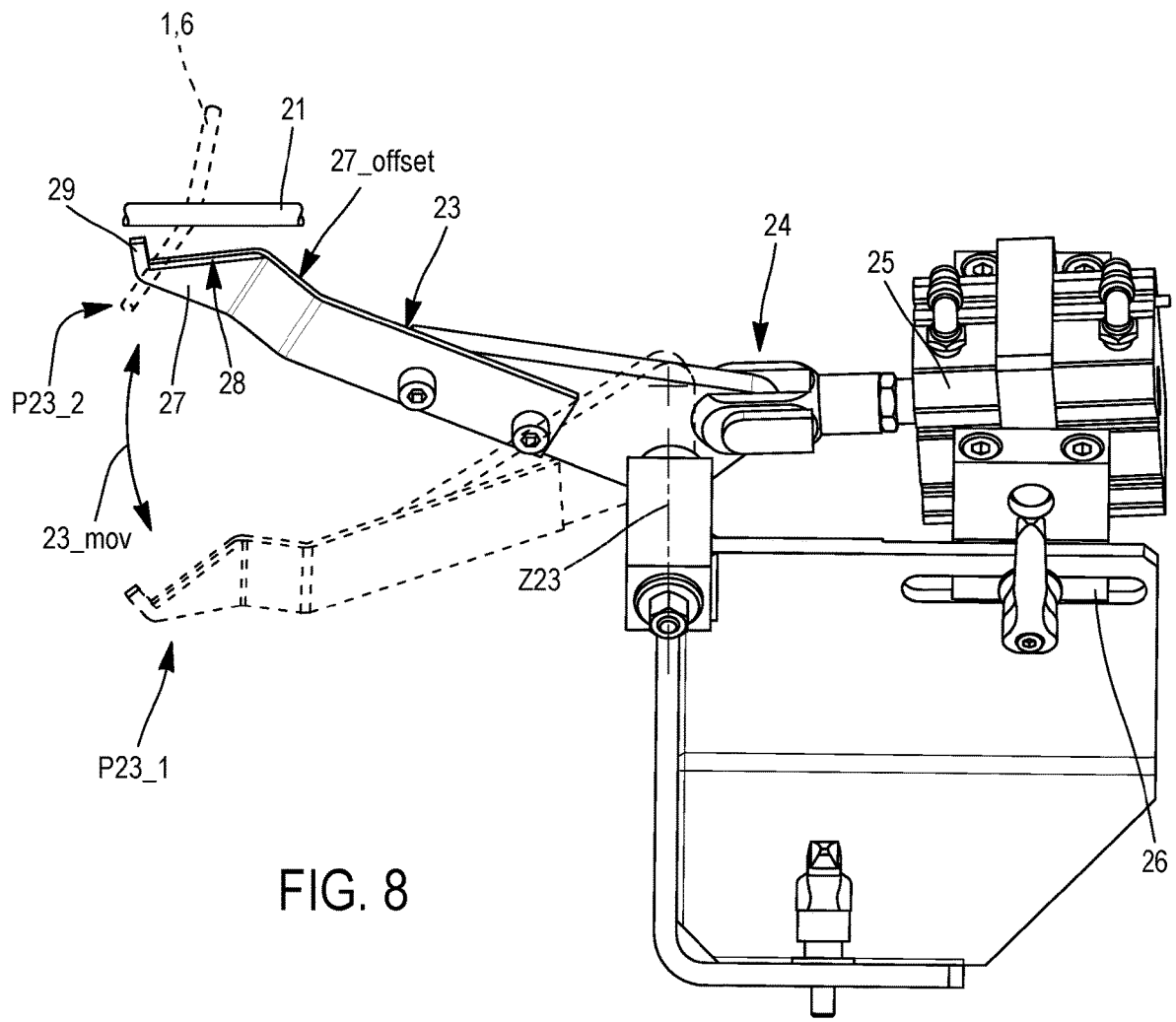
FIG. 8 illustrates, by a perspective view, an actuation subassembly of a swivelling punch used as folding tool on the installation of FIGS. 6 and 7.

Preferably, the punch 23 will be driven by a swivelling punching movement 23_mov, about a pivot axis Z23, between, on the one hand, a first position P23_1 called "standby position", here a low position on the installation of FIGS. 6, 7 and 8, in which the punch 23 is set back from the braided torus 4 and from the excess section 6, and, on the other hand, a second position P23_2, called "end-of-folding position", here a high position in FIGS. 6 to 8, in which the punch 23 completes the displacement of the excess section 6 necessary to the plastic formation of the elbow 17.

The movement of the punch 23_mov can be controlled by any appropriate motorized system, for example a system comprising a linkage 24 coupled to a motor 25 such as a cylinder 25, as is illustrated in FIG. 8.

It will also be possible to provide a member for setting the end-of-travel limits of the punch 23, for example by means of an oblong adjustment groove 26 which makes it possible to choose the position of the cylinder 25 within a predetermined range.

Figure 9:
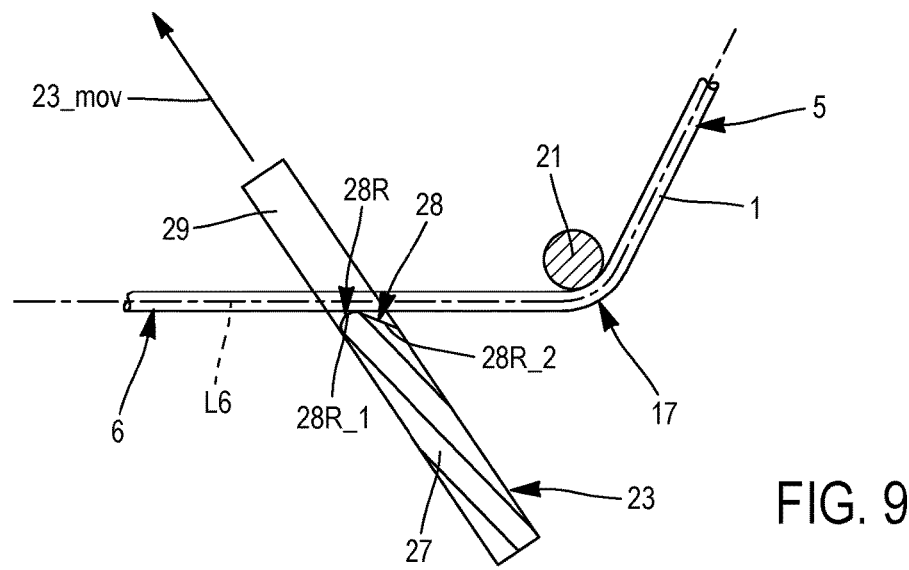
FIG. 9 presents a cross-sectional view of the edge of the punch of FIG. 8, intended to be applied, against the excess section of the braid wire, to provoke the folding of said braid wire.

Preferably, as is illustrated in FIGS. 8 and 9, the punch 23 has a hooking blade 27 which comprises a support edge 28, which is intended to come to bear on the excess section 6_in a direction transversal to the longitudinal direction of extension L6 of said excess section 6. As is illustrated in FIG. 9, said direction transversal to the longitudinal direction of extension L6 of the excess section will preferably correspond to the direction of the movement of the punch 23_mov.

Preferably, the support edge 28 is blunted according to a convex rounded profile 28R.

That advantageously makes it possible not to damage the braid wire 1 in the folding step, and in particular avoid tearing the coating from said braid wire.

That way, the creation of a zone where corrosion can begin, in which rust could develop and extend along the braid wire 1 is avoided in case of prolonged storage of the braided torus 4 (as may be the case if the braided torus 4 is stored in a buffer storage space, pending subsequent operations of cutting then joining by sleeve-coupling), until it reaches the winding section 5 and thus contaminates the bead wire.

Likewise, by avoiding damaging the braid wire 1, the generation of dust (from the braid wire 1 and/or from the coating thereof) which could result in pollution of the installation 9 and its environment, is avoided.

The convex rounded profile 28R will for example be able to comprise, as is visible in the cross-sectional view of FIG. 9, a rounded apex 28R_1, which reaches the excess section 6 first, then a bevelled side 28R_2, of flat type, preferably inclined with respect to the direction of the punch movement 23_mov, and against which the excess section 6 of the braid wire 1 will advantageously be able to progressively lay, as the plastic folding of the elbow 17 progresses.

Possibly, depending on the chosen travel setting, when the punch 23 reaches its second position P23_2 at the end of folding, the longitudinal direction L6 of the bent excess section 6 will be able to be almost parallel to the flat of the bevelled side 28R_2.

Preferentially, the radius of curvature of the rounded apex 28R_1 will be able to be between 0.5 mm and 3 mm, and for example equal to 1 mm.

The bevelled side 28R_2, preferably rectilinear, will, for its part, be able to preferably have an inclination of between 20 degrees and 45 degrees, and for example equal to 30 degrees, with respect to the direction of the punch movement 23_mov.

The soft profile of the edge 28 advantageously allows the punch 23 to approach the excess section 6 firstly by the rounded apex 28R_1 of the edge 28, then allows the excess section 6 to roll and slide smoothly along the convex rounded profile 28R, to adapt to the orientation that the folding of the elbow 17 confers little-by-little on said excess section 6.

Moreover, the hooking blade 27 of the punch 23 can comprise, regardless of the form of the support edge 28, and preferably in combination with a support edge 28 blunted according to a rounded convex profile 28R as described above, at least one lateral abutment 29, preferably formed by a shoulder 29, which is arranged protruding from the support edge 28 so as to be able to stop a lateral slipping of the excess section 6 along the support edge 28 during the movement of the punch 23_mov which is necessary to the recovery and the folding of said excess section 6.

Advantageously, such an abutment arrangement 29 allows the punch 23 to catch the excess section 6 on the fly, by performing a glancing pass along the braided torus 4, and more particularly by performing a pass level with the winding section 5, preferably in a direction substantially tangential to the generatrix line L3, and allows the punch 23 to not let said excess section 6 drop when continuing the punch movement 23_mov and deforming said excess section 6 by folding.

An excellent control of the folding process is thus assured.

It will be noted that, to favor a pass of the punch 23 level with the winding section 5 of the braided torus 4 without the risk of interference with said winding section 5, it will also be possible to provide, on the hooking blade 27, as is visible in FIG. 8, a blade offset 27 offset directed towards the position of the braided torus 4, for example produced by an "S" or "Z" folding of said hooking blade 27.

Moreover, preferably, in the braiding step (S1), the braid wire 1 which is wound about the generatrix line L3 is paid out from a reel 12 containing a reserve of braid wire, and, prior to the folding step (S2), the braid wire 1 is released from the reel 12, at a point of the braid wire 1 which is chosen to become a free end of the excess section 6, here an end of the output excess section 6_out, then, in the folding step (S2), the elbow 17, 17_out is produced so as to position said free end of the excess section 6, 6_out protruding with respect to the braid volume V5 of the braided torus 4, as is notably illustrated in FIGS. 1 to 4.

Advantageously, by releasing the braid wire 1, and more particularly the excess section 6, 6_out, with a view to the folding operation, said folding operation is facilitated.

In particular, this releasing makes it possible, as required, to freely orient the braided torus 4 in azimuth about the main axis Z3, and thus appropriately position the excess section 6, 6_out with respect to the anvil 21 and/or with respect to the path of the punch movement 23_mov, without the braided torus 4 being captive of the reel 12, and without it being necessary to adjust the quantity of braid wire released by the reel 12 in order to accompany a movement of orientation of the braided torus 4.

Any difficulty in positioning the braided torus 4, and any unnecessary consumption of braid wire 1, is thus avoided.

It will be noted that it is possible to envisage several possibilities for releasing the braided wire 1 at the end of the braiding operation:

according to a first possibility, it will be possible to provide, before the braiding operation, a reel 12 which has a reserve of braid wire 1 greater than the quantity of braid wire 1 necessary for the braiding operation, in this particular case which contains a length of braid wire 1 that is greater, preferably several times greater, than the aggregate length of the winding section 5 and of the adjacent excess sections 6, 6_in, 6_out; in this case, it will be possible to release the braid wire 1 by cutting said braid wire 1, after the braiding operation, at a point of the braid wire 1 which is chosen to become a free end of the excess section 6; that way, at the end of the braiding step (S1), the braid wire 1 which is present on the braided torus 4 will have been detached from the reserve of braid wire 1 which is (still) present on the reel 12;

according to a second possibility, that is particularly simple to implement and that will be preferred over the first possibility, provision will be made to install, on the reel 12, before the braiding step (S1), and more particularly before each braiding step (S1), the quantity of braid wire 1 that is just necessary and sufficient to proceed with the braiding operation concerned, that is to say, here, preferably a total length of braid wire 1 which corresponds to the aggregate of the length of braid wire 1 necessary to the formation of the winding section 5 and the length of braid wire 1 necessary to the formation of the excess section or sections 6, 6_in, 6_out which are adjacent to said winding section 5; in this case, the releasing of the braid wire 1 will occur automatically, by dropping of the free end of said braid wire 1, without requiring cutting, when said braid wire 1 has all been paid out from the reel 12, to be entirely consumed by the braiding operation.

Preferably, the elbow 17, 17_in, 17_out, and more preferentially at least the output elbow 17_out, forms an angle, called "elbow angle" A17, A17_in, A17_out, which lies between 45 degrees and 160 degrees, and preferably between 60 degrees and 135 degrees.

It will thus advantageously be possible to make the excess section 6 protrude according to an angle called "divergence angle" A6, with respect to the tangent to the generatrix line L3, which makes said excess section 6 accessible.

As an indication, the input elbow angle A17_in may be substantially equal to 90 degrees, for example between 85 degrees and 100 degrees.

Such a value will notably facilitate the hooking of the core 3 at the start of braiding, while avoiding having the input excess section 6_in hamper the braiding operation.

The output elbow angle A17_out will be able to be similar to, or preferably different from, the input elbow angle A17_in.

As an indication, the output elbow angle A17_out may be substantially equal to 120 degrees, and for example between 115 degrees and 135 degrees.

Such an output elbow angle A17_in will in fact be easy to produce by means of folding tools 20 external to the braided torus 4, while offering a good grip for subsequent manipulations of the braid wire 1.

Preferably, according to a preferential feature which can constitute an invention in its own right, and, if necessary, regardless of the elbow angle value A17 to be provided to achieve it, the abovementioned angle of divergence A6 is between 30 degrees and 90 degrees.

In the more specific case of the output excess section 6_out, the angle of divergence A6 will preferably be between 30 degrees and 60 degrees, and for example substantially equal to 45 degrees.

Advantageously, the abovementioned preferred ranges of angles allow the elbow 17 to have an angular aperture that is ideal to offer a grip to a manipulation tool, notably a pusher 30 of paddle type 31, 32, as will detailed hereinbelow.

These ranges of angles are also compatible with a stabilizing function of the elbow or elbows 17, which prevents an untimely unwinding of the constituent braid wire 1 of the winding section 5.

The abovementioned angle values A17, A17_in, A17_out, A6 extend obviously to such residual angles as remain after the folding step (S2), that is to say after relaxing of the folding strain exerted by the punch 23 and/or the anvil 21, and therefore after post-folding elastic return.

It will also be noted that the folding operation preferably makes it possible to obtain each elbow 17 by performing a single fold in the excess section 6 concerned, a single fold which, because of the rigidity of the braid wire 1, is naturally kept open according to the configuration, and more particularly according to the elbow angle A17, which is defined by the chosen degree of plastic deformation. In fact, it is advantageously not necessary, for example, to provide any third-party means, of twist or knot kind, to brace the elbow 17 or block the excess section 6_in the desired configuration.

Moreover, the radius of curvature of the elbow 17, considered inside said elbow 17, will preferably be less than or equal to 5 mm, for example between 1 mm and 3 mm.

The elbow 17 will thus be able to form a clear fracture in the excess section 6, and, in particular, offer a better, non-slipping, grip to a manipulation tool of the pusher kind.

Preferably, the folding step (S2) has the effect of increasing the distance which radially separates the excess section 6 from the main axis Z3.

More preferentially, if the braid volume V5 is considered to be contained radially within a radial limit, called "outer radial limit" RL_ext, with respect to the main axis Z3, then the elbow 17 is preferably arranged to keep the excess section 6 at least partly protruding beyond said outer radial limit RL_ext of the braid volume V5.

The outer radial limit RL_ext will preferably be able to correspond to a hypothetical cylinder, preferably of circular base, centered on the main axis Z3, coaxial to the ring formed by the generatrix line L3, externally tangential to the winding section 5, and in which the braid volume V5 is inscribed.

The region of the space situated beyond said outer radial limit RL_ext will, for convenience of description, be designated as being "the outside" EXT of the braided torus 4.

Advantageously, the choice to produce a "centrifugal" fold, which directs the excess section 6 away from the main axis Z3, and more preferentially the choice of producing a fold which brings the excess section 6 radially beyond the braid volume V5, makes it possible to easily perform, from the outside EXT of the braided torus 4, the punch movement 23_mov and/or anvil movement 21_mov which are necessary to the folding.

It is thus possible to arrange the folding tool 20, potentially relatively bulky, in the free space situated radially beyond the outer radial limit RL_ext of the winding section 5, which simplifies the arrangement and the operation of the installation 9.

Advantageously, the siting of the folding tool 20 beyond the braided torus 4 makes it possible to reserve, for the tools which are necessary to the braiding, the space, called "internal space" INT, that is contained radially within said braided torus 4, that is to say contained radially within an inner radial limit RL_int of the braided volume V5.

As for the outer radial limit RL_ext, it will preferably be possible to define the inner radial limit RL_int as a hypothetical cylinder which is centered on the main axis Z3, coaxial to the ring formed by the generatrix line L3, but internally (and not externally) tangential to the winding section 5, and which is therefore inscribed within the space radially delimited by the braid volume V5.

In particular, it will thus be possible to reserve this internal space INT for the guiding support 11 which drives the core 3 in azimuthal rotation, and for the movement of the reel 12 which generates the helical winding of the turns 2, during the braiding operation.

In addition, by folding the excess section 6 outward from the braided torus 4, an elbow 17 is created which, seen from the outside EXT of the braided torus 4, has a concave form, open on the outside EXT of the braided torus 4, and which therefore favors subsequent engagement and manipulation of the excess section 6 and of the end turn section 5_in, 5_out which is attached thereto.

Here again, the choice of a concave disposition, open on the external space EXT, notably makes it possible to install the tools necessary to such a manipulation on the outside EXT of the braided torus 4, in a space that is available and accessible, which simplifies the design, the setting, the operation and the maintenance of the installation 9.

Moreover, according to a preferential feature which can constitute an invention in its own right, applicable notably to any braided torus 4 provided with at least one, and preferably two, suitably conformed excess sections 6, the method can comprise, following the folding step (S2), a driving step (S3), during which a part of the excess section 6 considered is gripped in order to exert on said part of the excess section 6, a driving thrust F_S3 which is directed against the corresponding elbow 17 and therefore against an end portion of the winding section 5 which is attached to said elbow 17, called "end turn section" 5_in, 5_out, in such a way that said end turn section 5_in, 5_out is separated from the other turns 2, by elastic flexing of the braid wire 1, as is illustrated in FIG. 5B.

Advantageously, the local and temporary separation of an end portion 5_in, 5_out of the winding section 5 from the rest of said winding section 5 makes it possible to make the braid wire 1 which is located in this end portion of the winding section 5 accessible in order to perform other operations at this end portion, notably the operations of cutting and of joining by sleeve-coupling.

Advantageously, by using the elastic flexibility of the braid wire 1, and more precisely the structural flexibility of the end turns of the winding section 5, which behave substantially like springs, notably because they globally follow the general curvature of the generatrix line L3, this separation is reversible, which allows the end turn sections 5_in, 5_out which remain after the abovementioned cutting and sleeve-coupling operations, to reincorporate the braid volume V5 after said operations. That way, the driving operation does not affect the structure of the braided torus 4 which will be used ultimately in the bead wire.

The driving thrust F_S3 will preferably be oriented substantially in the direction of the hollow of the elbow 17, and consequently in a direction substantially opposite the direction in which the folding of the excess section 6 was done.

Particularly preferably, the driving thrust F_S3 will be directed towards the inside INT of the braided torus 4, and, for example, will be directed substantially centripetally, and notably radially centripetally, with respect to the main axis Z3.

In any case, the orientation and the direction of the driving thrust F_S3 will be chosen such that said driving thrust F_S3 tends in a way to partially unwind the end turn portions 5_in, 5_out of the winding section 5, so as to obtain the desired separation.

More preferentially, the driving step (S3) will make it possible to make the elbow 17 protrude radially to the interior INT of the braided torus 4, in other words will make it possible to bring the elbow 17 to a distance from the main axis Z3 which is shorter than the radius of the corresponding inner radial limit RL_int, as is illustrated in FIG. 5B.

It will thus be possible to proceed with the operations of cutting and of sleeve-coupling from the inside INT of the braided torus 4, while the driving thrust F_S3 is maintained by a tool acting from the outside EXT of this same braided torus 4.

Obviously, to implement the driving step (S3), the installation 9 will comprise a suitable driving tool 30, 31, 32.

To this end, the installation 9 preferably comprises a pusher 30 which is arranged to exert, on a part of the excess section 6, a driving thrust F_S3 which is directed against both the elbow 17 and an end portion of the winding section which is attached to said elbow 17, called "end turn section" 5_in, 5_out, so as to be able to separate said end turn section 5_in, 5_out from the other turns 2, by elastic flexing of the braid wire 1.

According to one possible implementation, the pusher 30 will be able to comprise a paddle 31, 32 which engages the excess section 6, and more preferentially the hollow of the elbow 17.

Preferably, said paddle 31, 32 can, to this end, be slipped into an interstice that is axially contained, with respect to the main axis Z3, between, on the one hand, the free branch of the excess section 6 which is linked to the elbow 17 and, on the other hand, the face, bottom or top, of the braided torus 4, at right angles to said main axis Z3, which is closest to said free branch of the excess section 6, as is illustrated in FIG. 5B.

By description convention, it is in fact possible to consider that the braided torus 4 extends axially, along the main axis, between, on the one hand, a first face called "bottom face", which corresponds to the intersection of the winding section 5 with a hypothetical plane at right angles to the main axis Z3 and which comes axially to bear tangentially against the winding section 5 on a first side of the braided torus 4, and, on the other hand, a second face, called "top face", which corresponds to the intersection of the winding section 5 with a second hypothetical plane at right angles to the main axis Z3 and which comes axially to bear tangentially against the winding section 5 on a second side of the braided torus 4, axially opposite the first side.

In the case where the braided torus 4 comprises, on the one hand, an input elbow 17_in, associated with a free branch of input excess section 6_in, and, on the other hand, an output elbow 17_out, associated with a free branch of output excess section 6_out, the pusher 30 can advantageously comprise a first paddle 31 and a second paddle 32 which act together, each against one of the elbows 17_in, 17_out, so as to, according to a preferential feature which can moreover constitute an invention in its own right, regardless of the form of the pusher 30, simultaneously separate the first end turn section 5_in and the second end turn section 5_out.

More specifically, if the input elbow 17_in and the output elbow 17_out, respectively the associated input excess section 6_in and output excess section 6_out, each extend facing a different face of the braided torus 4, for example if the input excess section 6_in runs on the side of the bottom face of the braided torus 4 while the output excess section 6_out runs on the side of the top face, as is illustrated in FIG. 5B, then the first paddle 31 will be able to be slipped under the braided torus 4, along the bottom face, to push back the input excess section 6_in, while the second paddle 32 will be able to be slipped over the braided torus 4, along the top face, to push back the output excess section 6_out.

Obviously, it would be possible to reverse, without departing from the scope of the disclosure, the abovementioned order of bottom/top arrangement of the elbows 17_in, 17_out and of the corresponding paddles 31, 32.

It will also be noted that the two excess sections 6_in, 6_out are preferably arranged so that, according to a preferential feature which can constitute an invention in its own right, their respective end turn sections 5_in, 5_out cross, when they are each subjected to a driving thrust F S3 at a crossing point 33, which is advantageously offset out of the braided volume V5. Here, said crossing point 33 is more particularly offset out of the braided volume V5 in a substantially radially centripetal direction, so as to be situated on the inside INT of the braided torus 4.

In practice, said crossing point 33 preferably substantially corresponds, along the braid wire 1, to the future location of a braid join 45 which will make it possible to join the input end turn section 5_in and the output end turn section 5_out to one another to permanently close the braid wire 1 on itself.

Preferably, the method comprises, while the end turn section 5_in, 5_out is kept separated from the other turns 2 by elastic flexing in accordance with the driving step (S3), a cutting step (S4) during which the braid wire 1 is cut at the end turn section 5_in, 5_out, so as to eliminate the corresponding elbow 17 and excess section 6.

More particularly, it will be possible to cut the braid wire 1, in the vicinity of the crossing point 33, on the one hand, at the input end turn section 5_in, so as to eliminate the input elbow 17_in and the input excess section 6_in, and, on the other hand, at the output end turn section 5_out, so as to eliminate the output elbow 17_out and the output excess section 6_out.

Advantageously, it is thus possible to very accurately adjust the residual length of the end turn sections 5_in, 5_out, so as to retain a length that is exactly necessary and sufficient to make it possible to then make a braid join 45 between said end turn sections 5_in, 5_out, as is illustrated in FIG. 5C, in order to definitively close the braid wire 1 on itself, in a conformation suited to the bead wire.

Furthermore, the cutting step (S4) can thus advantageously take place at the last moment, just before a braid join 45 is made.

That makes it possible to have, on the braid wire 1, joining surfaces that are clean, and in particular free of corrosion.

That also makes it possible to exploit the fact that the free ends of the braid wire 1 to be joined are still separated away from the winding section 5 to easily proceed with a join between these ends. On the other hand, it would in fact be difficult to grip said ends again if they were allowed to revert elastically to their place within the winding section 5 before having joined them.

Obviously, the installation 9 preferably comprises a cutting tool 40 which is arranged to be able to cut the braid wire 1 at the end turn section 5_in, 5_out concerned, while said end turn section 5_in, 5_out is separated from the other turns 2, so as to be able to eliminate the corresponding elbow 17 and excess section 6.

Furthermore, the installation 9 will preferably also comprise a joining tool arranged to then make a braid join 45 between the end turn sections 5_in, 5_out previously adjusted by the cutting step (S4).

Preferably, the braid join 45 will be made by means of a sleeve 46 which will be crimped onto said end turn sections 5_in, 5_out. The joining tool (not represented here) will then be able to take the form of a crimping tool.

Thus, the method will therefore preferably comprise a joining step (S5), during which the input end turn section 5_in and the output end turn section 5_out are linked to one another by means of a joining element 46, such as, for example, a sleeve 46 that is crimped onto said end turn sections 5_in, 5_out.

As indicated above, the joining step (S5) preferably takes place while the input 5_in and output 5_out end turn sections are still kept flexed, separated from the rest of the helical turns 5, by the driving thrust F_S3, here preferentially towards the inside INT of the braided torus 4.

By maintaining a driving thrust F_S3 during the cutting step (S4) and then the joining step (S5), so as not to relax the input end turn section 5_in and the output end turn section 5_out, it is advantageously possible to effectively perform all the useful cutting and joining operations, and do so without causing risk to the braid wire 1, and more globally without risking damaging the braided torus 4 and therefore the future bead wire.

According to a variant of the method which will be particularly preferred, notably because of its simplicity and speed of execution, it will be possible to produce an input elbow 17_in before the braiding, and an output elbow 17_out after the braiding.

Such a method will therefore be able to comprise, prior to the braiding step (S1), a preparation step (S0) during which there is provided, on the braid wire 1, a first surplus length of braid wire called "input excess section" 6_in which is intended to precede the winding section 5, and, in said input excess section, an input elbow 17_in is produced by plastic folding, so as to give said input excess section 6_in an angular form called "hook".

According to this method, in the braiding step (S1):
said hook 6_in is engaged against a core 3 which embodies the generatrix line L3, so as to retain the braid wire 1 relative to said core 3 when the winding of said braid wire 1 in helical turns 2 about the core 3 is begun,
then, the winding of the braid wire 1 in helical turns 2 about the core 3 is continued, so that the hook of the input excess section 6_in remains at least partly protruding with respect to the braid volume V5 occupied by said turns 2,
then, when the desired length of winding section 5 is reached, the forming of the helical turns 2 is stopped and, after the winding section 5, a surplus length of braid wire is provided forming an output excess section 6_out, also called "free wire".

Still according to this method, the folding step (S2) is executed so as to plastically deform the output excess section 6_out to form an output elbow 17_out which makes a part of said output excess section 6_out protrude with respect to the braid volume V5.

Furthermore, said method comprises, following the folding step (S2):
a driving step (S3) during which a driving thrust F_S3 is exerted jointly on the hook 6_in and on the free wire 6_out so as to separate from the other turns 2, by elastic flexing of the braid wire 1, on the one hand, an input end turn section 5_in, which links the input elbow 17_in to the winding section 5, and, on the other hand, an output end turn section 5_out, which links the winding section 5 to the output elbow 17_out, such that said input end turn section 5_in and output end turn section 5_out cross at a crossing point 33 which is offset outside of the braid volume V5 of the braided torus 4,
then a cutting step (S4), during which the braid wire 1 is cut, in the vicinity of the crossing point 33, on the one hand, at the input end turn section 5_in, so as to eliminate the input elbow 17_in and the hook 6_in, and, on the other hand, at the output end turn section 5_out, so as to eliminate the output elbow 17_out and the free wire 6_out,
then a joining step (S5), during which the input end turn section 5_in and the output end turn section 5_out are linked to one another by means of a joining element 46, such as, for example, a sleeve 46 that is crimped onto said end turn sections 5_in, 5_out.

It will be noted that the hook 6_in advantageously forms the stable start point of the braiding of the braid wire 1 about the core 3, while the free wire corresponds to the end point of said braiding.

The hook 6_in will advantageously be able to be formed by a tool of press type, provided with dies which correspond to the desired geometry of said hook 6_in, and more specifically to the desired corresponding input elbow angle A17_in.

It will also be noted that, moreover, regardless of the moment at which the input elbow 17_in and output elbow 17_out are formed, the input elbow 17_in and the output elbow 17_out are preferably arranged to make their input excess section 6_in, respectively output excess section 6_out, point globally in the same direction, that is to say to make the input excess section 6_in and the output excess section 6_out both point towards the inside INT of the braided torus 4, or, preferably and as is the case in FIGS. 2, 5A and 5B, both towards the outside EXT of the braided torus 4.

That facilitates the joint handling, and more particularly the joint driving, of the two excess sections 6_in, 6_out, and the formation of the crossing point 33.

Obviously, the disclosure is in no way limited to just the variant implementations described in the above, the person skilled in the art notably being able to isolate or freely combine with one another the abovementioned features, or replace them with equivalents.

In particular, it is possible to produce a "multilayer" bead wire by producing several successive distinct braidings about the same core 3, and more globally by repeating the method according to the disclosure several times, in principle as many times as there are layers that are to be made.

To this end, several distinct braid wires 1 will therefore be used in succession, said braid wires being implemented individually, at a rate of one new wire on each reiteration of the method.

More particularly, it will thus be possible to repeat, as many times as necessary, typically as many times as there are layers to be produced, a "complete" cycle comprising a preparation step (S0), a braiding step (S1), a folding step (S2), a driving step (S3), a cutting step (S4), and a joining step (S5).

Advantageously, a multilayer bead wire obtained in this way will have reinforced thickness and solidity.

What is claimed is:

1. A method for producing a bead wire intended for the reinforcement of a tire, said method comprising a braiding step during which a braid wire is wound in helical turns about, and along, a generatrix line which is closed in a ring on itself about a main axis, and a plurality of complete turns in azimuth about the main axis is thus described with said braid wire, so as to form, about said main axis, a braided torus that includes a bead wire element, the bead wire element having a winding section that is a portion of length which corresponds to the helical turns and which occupies a braid volume, and the bead wire element also having in an extension of said winding section, an excess section that includes a surplus length of braid wire, wherein, after the braiding step, the method further comprises a folding step during which the excess section is deformed plastically by folding, so as to form an elbow which makes the excess section diverge with respect to the helical turns and makes said excess section protrude at least partly with respect to the braid volume of the braided torus.

2. The method according to claim 1, wherein the elbow forms an elbow angle which lies between 45 degrees and 160 degrees.

3. The method according to claim 1, wherein the folding step has the effect of increasing the distance which radially separates the excess section with respect to the main axis.

4. The method according to claim 1, wherein the braid volume is contained radially within an outer radial limit relative to the main axis, and in that the elbow is arranged to keep the excess section at least partly protruding beyond said outer radial limit (RL_ext) of the braid volume.

5. The method according to claim 1, wherein, following the folding step, a driving step, during which there is engagement against a part of the excess section in order to exert, on said part of the excess section, a driving thrust which is directed against the corresponding elbow and an end portion turn section of the winding section which is attached to said elbow such that said end turn section is separated from the other turns, by elastic flexing of the braid wire.

6. The method according to claim 5, wherein, while the end turn section is kept separated with respect to the other turns by elastic flexing in accordance with the driving step, a cutting step during which the braid wire is cut at the end turn section, so as to eliminate the corresponding elbow and excess section.

7. The method according to claim 1, wherein, prior to the braiding step, a preparation step during which there is provided, on the braid wire, an input excess section that is a first surplus length of braid wire which is intended to precede the winding section, and an input elbow is produced in said input excess section, by plastic folding, so as to give said input excess section an angular form in the shape of a hook,
wherein, in the braiding step:
said hook is engaged against a core which embodies the generatrix line, so as to retain the braid wire relative to said core when the winding of said braid wire in helical turns about the core is begun,
then, the winding of the braid wire in helical turns about the core is continued, so that the hook of the input excess section remains at least partly protruding relative to the braid volume occupied by said turns,
then, when the desired length of winding section is reached, the forming of the helical turns is stopped and, after the winding section, a surplus length of braid wire is provided forming a free wire that is an output excess section,
and in that the folding step is executed so as to plastically deform the output excess section to form the output elbow which makes a part of said output excess section protrude with respect to the braid volume,
wherein it comprises, following the folding step:
a driving step during which a driving thrust is exerted jointly on the hook and on the free wire so as to separate from the other turns, by elastic flexing of the braid wire, on the one hand, an input end turn section, which links the input elbow to the winding section, and, on the other hand, an output end turn section, which links the winding section to the output elbow, such that said input end turn section and output end turn section cross at a crossing point which is offset out of the braid volume of the braided torus,
then a cutting step, during which the braid wire is cut, in the vicinity of the crossing point, on the one hand, at the input end turn section, so as to eliminate the input elbow and the hook, and, on the other hand, at the output end turn section, so as to eliminate the output elbow and the free wire,
then a joining step, during which the input end turn section and the output end turn section are linked to one another by means of a joining element, such as, for example, a sleeve that is crimped on said end turn sections.

8. The method according to claim 1, wherein, in the folding step, an anvil is offered up to the braided torus, and more preferentially, an anvil is applied against said braided torus, and the excess section is plastically deformed by folding against said anvil, so as to form the elbow.

9. The method according to claim 1, wherein, in the folding step, a movable punch is actuated to recover the excess section and perform, preferably against an anvil, the plastic folding of said excess section.

10. The method according to claim 9, wherein the punch has a hooking blade which comprises, on the one hand, a supporting edge, which is intended to press on the excess section in a direction transversal to the longitudinal direction of extension of said excess section, and which is blunted by a convex rounded profile, and, on the other hand, at least one lateral abutment, preferably formed by a shoulder, which is arranged protruding with respect to the supporting edge so as to be able to stop a lateral sliding of the excess section along the supporting edge during the movement of the punch which is necessary to the recovery and to the folding of the excess section.

11. The method according to claim 1, wherein, in the braiding step, the braid wire which is wound about the generatrix line is paid out from a reel containing a reserve of braid wire, and in that, prior to the folding step, the braid wire is released from the reel, at a point which is chosen to become a free end of the excess section, then, in the folding step, the elbow is produced so as to position said free end of the excess section protruding with respect to the braid volume of the braided torus.

12. The method according to claim 1, wherein the generatrix line is embodied by a core, single-strand or multi-strand, which is closed in a ring on itself about the main axis.

13. An installation for producing bead wires intended for the reinforcement of a tire, such as a pneumatic tire, said installation comprising a braiding station which comprises a guiding support which defines a path which follows a generatrix line which is closed in a ring on itself about a main axis, a reel arranged to bring a braid wire preferably metallic, and to cooperate with the guiding support in order to wind said braid wire in helical turns about, and along, said generatrix line so as to form, through a plurality of turns about said main axis, a braided torus that includes a bead wire element, the braid wire having a winding section that includes a portion of length which corresponds to the helical turns and which occupies a braid volume, and the braid wire also including an excess section that is an extension of said winding section which includes a surplus length of braid wire, wherein the installation also comprises a folding tool, distinct with respect to the reel, and arranged to recover, after the braiding operation, the excess section and perform a plastic folding of said excess section so as to form an elbow which makes the excess section diverge with respect to the helical turns and makes said excess section protrude at least partly with respect to the braid volume of the braided torus.

14. The installation according to claim 13, wherein the folding tool comprises:
   a retractable anvil, which is movable between, on the one hand, a retracted position that it occupies during the braiding operation and in which said anvil is sufficiently far away from the generatrix line not to interfere with the braiding operation or the braided torus being produced, and an extended position that said anvil adopts for the folding operation, and in which said anvil is closer to the braided torus than in the first position, and preferably in which said anvil is pressed against said braided torus,
   and a punch, which is movable relative to said anvil and arranged to recover the excess section and fold back said excess section against the anvil to cause the plastic deformation which is necessary to the formation of the elbow.

15. The installation according to claim 13, wherein:
   a pusher is arranged to exert, on a part of the excess section, a driving thrust which is directed against both the elbow and an end turn section that includes an end portion of the winding section which is attached to said elbow so as to be able to separate said end turn section from the other turns, by elastic flexing of the braid wire,
   and a cutting tool is arranged to be able to cut the braid wire at the end turn section concerned, while said end turn section is separated from the other turns, so as to be able to eliminate the corresponding elbow and excess section.

16. The method according to claim 2, wherein the elbow angle is in the range of between 60 degrees and 135 degrees.

* * * * *